Patented Sept. 14, 1943

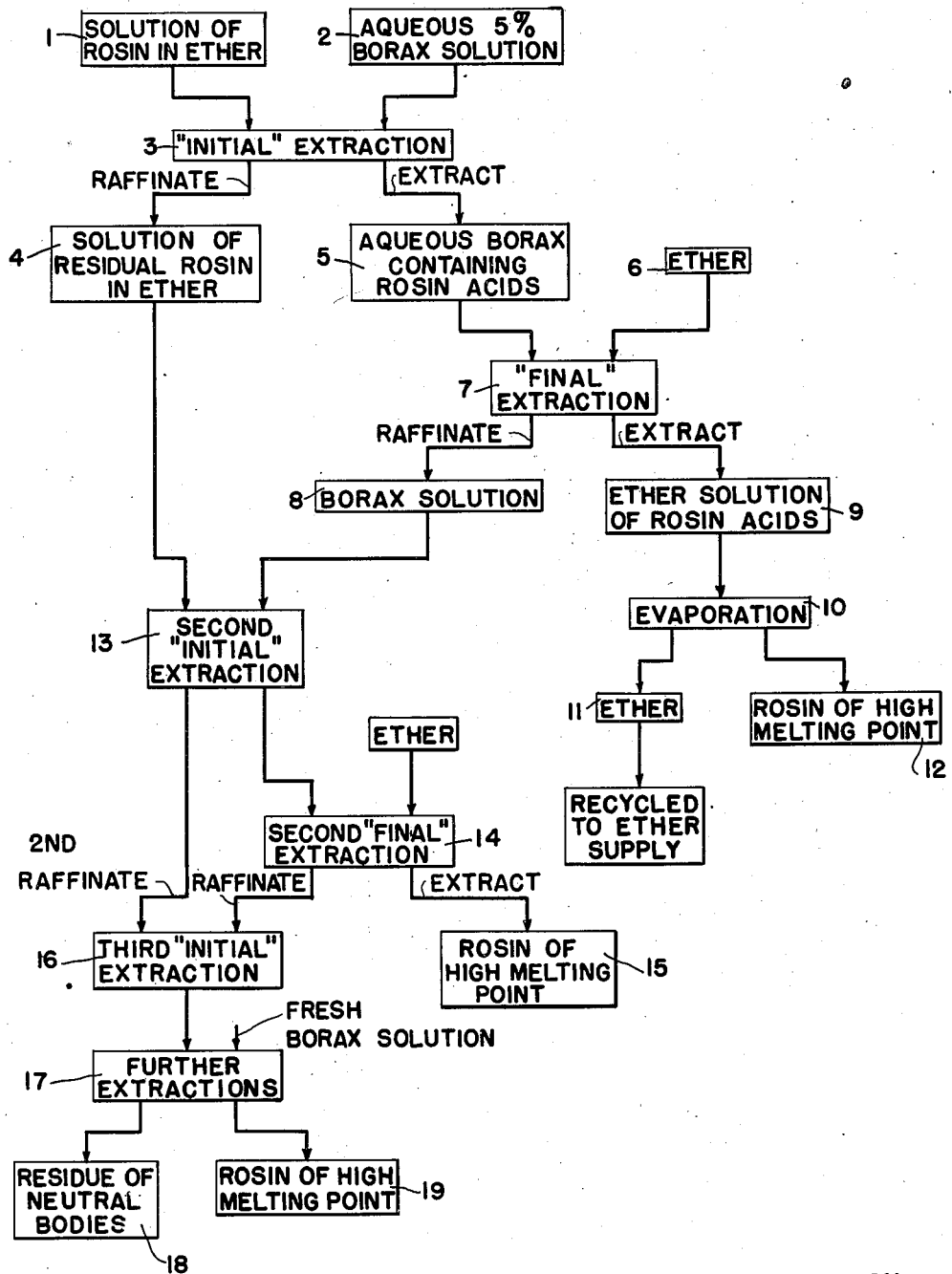

2,329,515

UNITED STATES PATENT OFFICE 2,329,515

TREATMENT OF ROSIN OR MODIFIED ROSIN

Richard F. B. Cox, Wilmington, Del., assignor to Hercules Powder Company, Wilmington, Del., a corporation of Delaware Application March 5, 1941, Serial No. 381,779

14 Claims. (Cl. 260—100)

This invention relates to a process for the separation and recovery of resin acids from rosin and modified rosins.

Rosin acids have heretofore been separated from rosin by distillation, by crystallization of the acids, by crystallization of the sodium acid abietate, and by extraction with alkalies. Distillation causes the rosin to isomerize to abietic acid, a very readily crystallizing acid, and the resulting rosin has a pronounced tendency to crystallize. Crystallization of the acids or the sodium acid abietate produces a crystalline rosin. Extraction of the acids by alkalies involves the subsequent acidification of the soap formed in order to free the rosin acids which is inconvenient and expensive. Moreover, these prior processes selectively remove abietic acid and abietic-like acids, and do not remove the rosin acids in the proportions in which they are present in the original rosin.

Rosin which is substantially freed of neutral bodies by following the present invention is adapted to many uses for which ordinary rosin, because of its lower melting point or its odor, is unsatisfactory.

The neutral bodies which can be removed from rosin (say ordinary refined wood rosin) by applying the principles of the present invention usually amount to about 10% by weight of the rosin. They are soft and fluid and have a marked effect in lowering the melting point of the rosin. For example, a wood rosin which had a drop melting point of 80.5° C. before removal of the neutral bodies, melted at 88.7° C. after their removal by the process of the present invention. Likewise a gum rosin melted at 86.2° C. before removing the neutral bodies, and at 91.2° C. afterwards. This increased melting point is also carried over to the esters such as the polyhydric alcohol esters such as ester gum prepared from the treated rosin.

This invention has as its object to provide an improved process for the recovery of resin acids from rosin and modified rosins.

A further object is to provide an improved process for the production of rosin and modified rosins of substantially increased melting point.

Another object is to provide new products.

Other objects will appear hereinafter.

These objects are accomplished by the present invention by extracting the rosin or modified resin with an alkali salt of a weak inorganic acid, and recovering the resin acids from the extract. For example, a solution of the rosin or modified rosin in an organic solvent may be extracted with a solution of an alkali salt of a weak inorganic acid in a suitable solvent such as water which is capable of immiscibility with the organic solvent, whereupon the resin acids are subsequently extracted from the alkaline salt solution by an organic solvent which is likewise capable of immiscibility with the alkaline salt solution. The resin acids taken up by this last solvent are then recovered by evaporation of the organic solvent.

As the raw material I may employ any type of rosin such as wood rosin, gum rosin, so-called non-crystallizing gum rosin, heat treated rosin, isomerized rosin, etc. Instead of gum rosin, I may use a solution thereof in turpentine such as the naturally occurring crude or refined pine oleoresin, or the non-crystallizing pine oleoresin of Palkin 2,176,660, etc. I prefer to use a refined rosin, that is a rosin which contains only a very small amount (2% or less) of gasoline-insoluble resin acids. The production of such a refined rosin may be by any of the well-known refining processes such as with furfural or other selective solvent, selective adsorbents, etc. Instead of using rosin, I may use chemically modified rosin such as disproportionated rosin which is known as "Hyex" rosin and which is rosin which has been heated with a hydrogenating catalyst, but in the absence of hydrogen (U. S. patent to Littmann, 2,154,629), polymerized rosin, hydrogenated rosin, etc.

As the solvent for the rosin or modified rosin I prefer to use a lower aliphatic ether, that is, an ether in which the number of carbon atoms in the alkyl groups is not greater than six, and which is immiscible with water at ordinary temperatures. I have found diethyl ether to be particularly satisfactory. Examples of other suitable ethers are di-isopropyl ether, di-n-propyl ether, dibutyl ether, methyl propyl ether, methyl butyl ether, ethyl propyl ether, ethyl butyl ether, b-b-dichloroethyl ether, etc.

Instead of using a lower aliphatic ether as the solvent for the rosin or modified rosin, I may use other solvents such as liquid aromatic hydrocarbons such as benzene, toluene, xylene, coal tar naphtha, etc. petroleum hydrocarbon solvents such as petroleum ether, petroleum naphtha, hydrogenated petroleum naphtha, gasoline, kerosene, V. M. & P. naphtha, cyclohexane, tetrahydronaphthalene, decahydronaphthalene, dipentene, turpentine, chlorinated hydrocarbons such as chloroform, carbon tetrachloride, ethylene dichloride, trichloroethylene, monochlorobenzene, etc. I prefer to use a solvent which is immiscible with or capable of immiscibility with water thus enabling the use of water as the solvent for the extracting salt. I prefer to use an ether solvent which is not substantially completely insoluble in water but which is not soluble in water to an extent greater than about 8% by weight such as diethyl ether.

The concentration of the initial solution may vary widely for example from about 10% to about 70% by weight of the rosin or modified rosin based on the weight of the solution.

As the extracting agent, I prefer to use ordinary borax, or sodium tetraborate with varying amounts of, or no, water of crystallization. Instead of sodium tetraborate, I may use sodium metaborate or other alkali metal salts of boric acids. Thus, I may use mixtures of alkali hydroxide and ordinary boric acid in varying proportions. I prefer to use an extractant containing alkali in amount equal to one-half of the molar amount of boric acid. Thus, I prefer to use sodium tetraborate (which is derived from 2 mols of sodium hydroxide and 4 mols of boric acid) or a mixture of sodium hydroxide and boric acid in the ratio of two mols of sodium hydroxide to four mols of boric acid.

The use of alkali metaborates results in extraction of a higher percentage of the neutral bodies than when alkali metal tetraborates such as borax, or alkali salts of other weak inorganic acids are employed.

Instead of an alkali salt of a boric acid, I may use strong or fixed alkali salts of other weak inorganic acids, such as carbonic acid, sulfurous acid, phosphoric acid, phosphorous acid, etc., provided that the salt when dissolved in water to form a 5% solution has a pH between about 8.0 and about 12. In the case of the polybasic inorganic acids, I may use either the neutral or the acid salts provided that the pH of an aqueous 5% solution thereof is between 8.0 and 12.0. Thus, I may use the alkali (sodium, potassium, lithium) carbonates, phosphates, sulfites, and phosphites, or such acid salts as the alkali bicarbonates, and the di-alkali monohydrogen phosphates, etc. The acid, of which the alkali salt is employed, should be readily soluble in water or other solvent employed for the alkali salt, but substantially insoluble in the organic solvent used to dissolve the rosin or modified rosin initially and also in the organic extraction solvent used to extract the aqueous salt extract. I find it desirable to use those alkali salts which are readily soluble in water or other solvent for the alkali salt but which are substantially insoluble in the organic solvent used to dissolve the rosin or modified rosin initially, or to extract the aqueous salt extract.

The extractant is preferably employed in solution in a solvent which is capable of immiscibility with the solvent employed in forming the rosin or modified rosin solution and which is a solvent for the extractant and is a non-solvent for rosin, modified rosin or the resin acids present therein. I prefer to use water as the solvent for the alkali salt extractant.

The concentration of the alkali salt solution may very between wide limits provided that the pH of the solution falls between about 8.0 and about 12.0. Ordinarily it will be preferred to employ a concentration between about 0.5% by weight of the alkali salt and the limit of solubility thereof at the temperature employed but preferably not exceeding 10%. Usually a concentration of from about 1% to about 5% of the alkali salt will be employed. The percentages given refer to the anhydrous alkali salt. In the case of borax, I prefer to use an aqueous solution containing about 5% of the hydrous borax, i. e. the decahydrate.

The amount of the extracting agent employed may vary within wide limits depending upon the extent of completeness of removal of resin acids desired. In general, it may vary from about one-fifth to about fifty parts of the extracting agent to one part of the rosin or modified rosin.

Following the initial extraction with the aqueous alkali salt solution the aqueous extract phase containing dissolved or combined resin acids is separated from the rosin or modified rosin solution phase, and extracted with a solvent for the resin acids contained therein. The solvent used in this final extraction should be capable of immiscibility with the alkali salt solution and may or may not be the same as that employed to initially dissolve the rosin or modified rosin. Any of the solvents enumerated above may be employed. Again, I prefer to use a lower aliphatic ether, specifically diethyl ether.

The amount of solvent employed in the final extraction may vary within wide limits depending upon its solvent power for resin acids and upon the quantity of resin acids present in the alkali salt solution extract. In general, it may vary between about 5 and about 15 times the weight of extractant (alkali salt) present in the extract.

Following the final extraction with organic solvent the phases are separated in any suitable manner. The solvent phase is evaporated to recover the resin acids dissolved therein. The alkali salt phase may be employed in a re-extraction of the raffinate phase obtained from the first extraction. The alkali salt phase may be used over and over in a repetition of the extraction, until it becomes saturated with certain resin acids which are difficultly or not at all removable by extraction with the organic solvent such as ether.

In the drawing, there is portrayed a flow sheet of the process as applied to rosin, using aqueous borax as the initial extractant and using ether as the solvent both initially for the rosin and for the final extraction. The rosin solution in ether and the borax solution are commingled in the initial extraction step (block 3), and the phases separated. The extract (block 5) is extracted (block 7) with fresh ether. The extract from this final extraction (block 9) is evaporated to recover the rosin of high melting point (block 12) and ether (block 11) which is re-cycled. The raffinate (block 8) is used to extract the raffinate (block 4) from the first initial extraction. The extract from the second initial extraction (block 13) is extracted (block 14) with ether as before. The raffinate from the second final extraction (block 14) is again used to extract the raffinate from the second initial extraction, etc., until the borax solution exerts no extracting power whereupon the resin acids therein may be precipitated therefrom if desired by neutralization with inorganic acid, and a fresh borax solution employed for subsequent extractions. The ultimate residue is rich in neutral bodies derived from the rosin.

If desired, fresh lots of borax solution may be used instead of the raffinates from the final extractions for the re-extraction of the raffinates from the initial extractions.

The extraction may be conducted either batchwise or continuously. Where a continuous process is used, a solution of the rosin or modified rosin in diethyl ether may be contacted continuously either countercurrently or concurrently with the aqueous borax solution in a suitable packed tower, the aqueous extract being then passed into another tower where it continuously contacts fresh ether. The resulting ether extract is then evaporated to recover the extracted rosin acids and the aqueous borax raffinate is recycled back to the first tower.

The mechanism of the process probably involves the following equation:

$$AbOH + RX \rightleftarrows AbOR + HX$$

where AbOH is a resin acid, RX is a strong alkali salt of a weak acid, AbOR is an alkali salt of a resin acid and HX is a weak inorganic acid soluble in water but insoluble in the organic extraction solvent. When the rosin solution is contacted with the RX solution, the equilibrium is shifted to the right so that AbOR is formed to some extent and HX is formed in solution. When the aqueous solution is separated and contacted with fresh solvent, the resin acid is taken up by the organic solvent so that the equilibrium is shifted back to the left. In this manner, the solution of alkali salt is substantially freed of resin acid and can be used over and over. In practice, however, some rosins and modified rosins such as for example unrefined or FF wood rosin contain small amounts of so-called strong acids which combine with the RX solution and are not completely or are not at all extracted by fresh organic solvent. This difficulty is overcome by using a fresh RX solution after the first several extractions. The fresh RX solution can be used over and over after the so-called strong acids have been removed by the first few extractions. The RX solution thus acts as a carrier for the resin acids, carrying them from a solvent containing a high concentration of resin acids to a solvent containing little or no resin acid. The process of the present invention then is one in which there is no or only very little consumption of chemicals.

The process of the present invention has an additional advantage over other processes for segregating resin acids in that the acids isolated comprise a mixture which is essentially non-crystalline and non-crystallizing. A further advantage is that the alkali solution carrier can be used over and over. A still further advantage is that no or only minor amounts of mineral acid are required for neutralization which is to be contrasted with the amounts required when NaOH, for example, is used for the extraction of resin acids.

Desirably, I may subject to selective solvent refining the resin acids recovered from the final extract. Thus, I may treat with an immiscible selective solvent for color bodies, such as furfural, phenol, etc. a solution of the recovered resin acids either in the final extract solution or re-dissolved in a suitable solvent such as light petroleum distillate. This step is particularly suitable where an unrefined rosin was originally taken.

By selective solvent refining the product in this way, I produce a product even lighter in color and still richer in resin acids and lower in neutral bodies.

The residual rosin or modified rosin rich in neutral bodies may also be refined. If desired, its neutral body content may be decreased by distillation, alkaline extraction, etc.

The products produced by the present invention are new so far as I am aware. Thus, when the invention is applied to rosin such as ordinary wood rosin, the extracted rosin acids constitute an improved rosin which has great freedom from crystallizing tendencies, a drop melting point above 87° C., an acid number of from 175 to 180, and an unsaponifiable content less than 5%. When the invention is applied to polymerized rosin such as ordinary polymerized wood rosin, an improved polymerized rosin is obtained from the extract, having a drop melting point above 100° C., an acid number of from 177 to 185 and a content of unsaponifiable matter less than 5%. The residual rosin, also believed to be new, is characterized by a neutral body content of at least 15%, an acid number of less than 155, and an unsaponifiable content of at least 10%. The numerical values of these characteristics of the residual rosin will depend upon the extent of the extraction. Thus, if the extraction is very prolonged, the residue will consist chiefly of neutral bodies and will be a soft liquid.

The product obtained by treatment of hydrogenated rosin in accordance with the invention is likewise thought to be new. Thus, from the extract from hydrogenated rosin I obtain a hydrogenated rosin having a drop melting point above 83° C., an acid number of from 170 to 180 and a content of unsaponifiable matter less than 5%.

The process is effective in the removal of the polymerizing catalyst from polymerized rosin. Thus where sulfuric acid is present in crude polymerized rosin, application of the process of the present invention enables its ready separation from the polymerized rosin acids. The sulfuric acid and complexes thereof are so strong that they stay with the borax or other extracting salt and are nonextractable by the ether or other extracting solvent used in the final extraction.

Below are given a number of specific examples of modes of carrying the invention into practice.

*Example 1*

Two hundred and fifty parts by weight FF wood rosin was dissolved in 700 parts by weight diethyl ether and extracted with 1000 parts by weight 5% borax (pH—9.0). The borax extract was then extracted with 700 parts by weight diethyl ether. The first two portions of borax were used for four extractions, then fresh borax was used over and over for the subsequent extractions. The combined borax extractions after ether extraction were acidified to precipitate those acids which could not be removed from the borax by extraction with ether. These so-called strong acids amounted to 10 parts by weight. The ether which was used for extracting the borax solutions on evaporation yielded:

First   4000 parts by weight borax solution yielded   58.8 parts by weight resin acids
Second  4000 parts by weight borax solution yielded   45.2 parts by weight resin acids
Third   4000 parts by weight borax solution yielded   12.5 parts by weight resin acids
Fourth  4000 parts by weight borax solution yielded    2.2 parts by weight resin acids
Fifth   4000 parts by weight borax solution yielded    1.6 parts by weight resin acids Total borax extractable acids_____ 120.3

The borax extractable acids were refined by washing a 20% solution in narrow range gasoline (B. R. 200–270° F.) with 40 parts by weight furfural, then with 20 parts by weight furfural three times. Finally two washes with 15 parts furfural each were given. The rosin after removal of the solvent graded M in color. A similar refining of the original FF rosin with all but the last furfural washes yielded a rosin grading K in color.

Example 2

Two hundred and fifty parts by weight of a polymerized rosin melting at 98–99° C. (drop method) and having an acid number 154.5–155.5 was dissolved in 700 parts by weight of diethyl ether and extracted as in Example 1. The yield of resin acids was as follows:

| | | |
|---|---|---|
| First | 4000 parts borax solution yielded | 51.1 parts resin acid |
| Second | 4000 parts borax solution yielded | 30.0 parts resin acid |
| Third | 4000 parts borax solution yielded | 1.8 parts resin acid |
| Fourth | 4000 parts borax solution yielded | 2.0 parts resin acid |
| | Total borax extractable acids | 84.9 parts by weight |

The melting point of the acids was 104.7° (drop method). The acid number was 177.0, the saponification number was 180.7° and the thiocyanogen number was 68.2.

Example 3

Two hundred and fifty parts by weight of a heat treated rosin in 350 parts by weight of diethyl ether was extracted with 500 parts by weight of 5% borax as in Example 1. The borax extracts were each washed with 350 parts by weight of diethyl ether to remove the resin acids. The yields of acids were as follows:

| | | |
|---|---|---|
| First | 4000 parts borax solution yielded | 69.6 parts by weight resin acid |
| Second | 4000 parts borax solution yielded | 37.0 parts by weight resin acid |
| Third | 4000 parts borax solution yielded | 16.6 parts by weight resin acid |
| Fourth | 4000 parts borax solution yielded | 1.3 parts by weight resin acid |
| | Total | 124.5 |

The melting point of the acids was 87.7° C., the acid number was 174.7, and the saponification number was 181.5.

Example 4

Five hundred parts by weight I gum rosin (M. P. 86° C.) were dissolved in 350 parts by weight diethyl ether and extracted with 500 parts by weight of 5% borax solution. The borax extracts were each washed with 350 parts by weight of ether to remove the resin acids. The extraction was carried out as in Example 1, 32 extractions being made. The resin acids were recovered by evaporation of the ether. The total amount of resin acids thus obtained amounted to 433 parts by weight. The melting point of the acids was 91° C. The ester gum of the acids melted at 101° C.

Example 5

Two hundred and fifty parts by weight of wood rosin was dissolved in 870 parts by weight of toluene and the solution extracted with 1000 parts by weight of 5% borax solution. The borax solution was then extracted with 870 parts by weight of toluene. The extraction with borax and extraction of the borax solution with toluene was repeated three times. From 4000 parts by weight of borax extract there was thus obtained 3.2 parts by weight of resin acid.

Example 6

Five hundred parts by weight "I" wood rosin were dissolved in 1250 parts by weight of petroleum ether. This solution was extracted with 2000 parts by weight 5% borax. The borax solution was then extracted with 1250 parts by weight of petroleum ether. This extraction with borax and extraction of the borax with petroleum ether was repeated again. From the petroleum ether there was obtained by evaporation 3.3 parts by weight of resin acid.

Example 7

Two hundred and fifty parts by weight "I" wood rosin was dissolved in 700 parts by weight of diethyl ether and extracted with 1000 parts by weight of 5% borax solution. The borax solution was then extracted with 700 parts diethyl ether to remove the resin acids. This process of extraction was repeated twenty-three times. The resin acids were isolated by evaporation of the ether. The results were as follows:

| | | |
|---|---|---|
| First | 4000 parts by weight borax yielded | 86.6 parts resin acid |
| Second | 4000 parts by weight borax yielded | 71.4 parts resin acid |
| Third | 4000 parts by weight borax yielded | 11.5 parts resin acid |
| Fourth | 4000 parts by weight borax yielded | 2.0 parts resin acid |
| Fifth | 4000 parts by weight borax yielded | 1.9 parts resin acid |
| Sixth | 4000 parts by weight borax yielded | 1.4 parts resin acid |
| | Total | 174.8 |

The melting point of the acids was 89.5° C., the acid number was 176.9, the saponification number was 178 and the thiocyanogen number was 92.2. The ester gum of the acids melted at 97° C.

Example 8

Two hundred and fifty parts by weight of hydrogenated wood rosin (melting point 79° C.) was extracted as described in Example 7. The total weight of resin acids removed amounted to 149.1 parts by weight. The resin acids had a melting point of 83.7° C. (drop method), and an acid number of 174.0, a saponification number of 176.7, and a thiocyanogen number of 28.0. The ester gum of the acids melted above 90° C.

Example 9

A solution of 250 parts by weight of K wood rosin in 300 parts by weight diethyl ether was agitated with four portions of 5% $Na_3PO_4.12H_2O$ solution (pH 11.0) amounting to 500 parts by weight each. After complete separation into two layers, the trisodium phosphate layers were separated and each extracted with one portion of diethyl ether amounting to 300 parts by weight. The resulting 1200 parts by weight of diethyl ether were evaporated to obtain the resin acids which amounted to 9.0 parts by weight.

Example 10

By substituting 3.4% sodium metaborate solution (pH 9.35) for the trisodium phosphate solution in Example 9, a yield of 154 parts by weight of resin acid was obtained from the 1200 parts by weight of diethyl ether. The resin acid was much higher in neutral body content, however.

Example 11

By substituting 3% disodium phosphate solution (pH 9.0) for the trisodium phosphate solution in Example 9 and carrying out the process as outlined in Example 9, the yield of resin acid from 1200 parts by weight of diethyl ether was 8.3 parts by weight.

Example 12

By substituting 3% sodium bicarbonate solution (pH 8.2) for the trisodium phosphate solution in Example 9 and carrying out the process as outlined in Example 9, the yield of resin acid from the 1200 parts by weight of diethyl ether was 7.7 parts by weight.

Example 13

By substituting 3% $Na_2CO_3.2H_2O$ solution (pH 10.7) for the trisodium phosphate solution in Example 9 and carrying out two of the extraction processes outlined in Example 9, the yield of resin acid from 600 parts by weight of diethyl ether was 19.1 parts by weight.

Example 14

Five hundred parts by weight crude pine oleoresin were dissolved by gentle heating with 250 parts by weight diethyl ether. The solution was filtered to remove water and foreign matter. The filtrate was extracted with 500 parts by weight of 5% borax solution. The borax extract was washed with 350 parts by weight of ether to remove the resin acids. The extraction was repeated as in Example 1, thirty-two extractions being made. The resin acids were recovered by evaporation of the ether extracts.

Example 15

Five hundred parts by weight of so-called non-crystallizing gum rosin (prepared by the method of Palkin et al., U. S. P. No. 2,176,660) was commingled with 350 parts by weight diethyl ether and the solution extracted with 500 parts by weight of 5% borax solution, as in Example 1, thirty-two extractions being made. The extracts were extracted with ether as before and the ether extracts evaporated to recover the extracted rosin acids. This constituted a way of obtaining an improved gum rosin low in unsaponifiable from a gum rosin containing a larger content of unsaponifiable than average gum rosin, since the treatment of Palkin et al. markedly increases the unsaponifiable content.

As used in this specification and in the claims appended hereto, the term "modified rosin" refers to ordinary rosin which has been treated so as to chemically change its rosin nucleus without substantially affecting its carboxylic acid grouping, as for example by heat treatment, isomerization, hydrogenation, polymerization, disproportionation, etc. The term "solvent capable of immiscibility" is used to include solvents which either are immiscible or may be made immiscible as by changing the temperature.

It will be understood that the details and examples hereinbefore set forth are illustrative only and that the invention as broadly described and claimed is in no way limited thereby.

What I claim and desire to protect by Letters Patent is:

1. As a new composition, a rosin product consisting essentially of a non-crystalline mixture of rosin acids derived from rosin by the process in accordance with claim 2, said rosin product having a drop melting point above 87° C., an acid number of from 175 to 180, and a content of unsaponifiable matter less than 5%.

2. The process of refining rosin products which comprises bringing into contact a solution of a resin selected from the group consisting of rosin, isomerized rosin, heat-treated rosin, hydrogenated rosin, polymerized rosin, and disproportionated rosin, and an aqueous solution capable of immiscibility therewith of an inorganic alkaline salt of an alkali metal, the said solution having a pH between about 8 and about 12, extracting acidic components from the initial resin solution into the alkaline salt solution, separating the salt solution from the resin solution, bringing the salt solution into contact with a solvent capable of immiscibility therewith, the said solvent being a solvent for resin acids but substantially non-solvent for the alkali metal salt, the acid thereof, and the alkali salt-resin acid extraction product, extracting resin acids from the salt solution into the solvent immiscible therewith, and separating the resulting solvent phase containing extracted resin acids from the salt solution.

3. The process of refining rosin products which comprises bringing into contact a solution of a resin selected from the group consisting of rosin, isomerized rosin, heat-treated rosin, hydrogenated rosin, polymerized rosin, and disproportionated rosin, and an aqueous solution capable of immiscibility therewith of an inorganic alkaline salt of an alkali metal, the said solution having a pH between about 8 and about 12, extracting acidic components from the initial resin solution into the alkaline salt solution, separating the salt solution from the resin solution, bringing the salt solution into contact with a solvent capable of immiscibility therewith, the said solvent being a solvent for resin acids but substantially non-solvent for the alkali metal salt, the acid thereof, and the alkali salt-resin acid extraction product, extracting resin acids from the salt solution into the solvent immiscible therewith, separating the resulting solvent phase containing extracted resin acids from the salt solution, and recovering a refined rosin product from the separated solvent phase.

4. The process of refining rosin products which comprises bringing into contact a lower aliphatic ether solution of a resin selected from the group consisting of rosin, isomerized rosin, heat-treated rosin, hydrogenated rosin, polymerized rosin, and disproportionated rosin, and an aqueous solution capable of immiscibility therewith of an inorganic alkaline salt of an alkali metal, the said solution having a pH between about 8 and about 12, extracting acidic components from the initial resin solution into the alkaline salt solution, separating the salt solution from the resin solution, bringing the salt solution into contact with a lower aliphatic ether, extracting resin acids from the salt solution into the lower aliphatic ether, and separating the resulting ether phase containing extracted resin acids from the salt solution.

5. The process of refining rosin products which comprises bringing into contact a solution of a resin selected from the group consisting of rosin, isomerized rosin, heat-treated rosin, hydrogenated rosin, polymerized rosin, and disproportionated rosin, and an aqueous solution capable of immiscibility therewith of a salt of a boric acid and an alkali metal, the said borate solution having a pH between about 8 and about 12, extracting acidic components from the initial resin solution into the borate salt solution, separating the borate salt solution from the resin solution, bringing the borate salt solution into contact with a solvent capable of immiscibility therewith, the said solvent being a solvent for resin acids but substantially non-solvent for the alkali metal salt, the boric acid thereof, and the alkali metal borate-resin acid extraction product, extracting resin acids from the borate salt solution into the solvent immiscible therewith, and separating the resulting solvent phase containing extracted resin acids from the borate salt solution.

6. The process of refining rosin products which comprises bringing into contact a lower aliphatic ether solution of a resin selected from the group consisting of rosin, isomerized rosin, heat-treated rosin, hydrogenated rosin, polymerized rosin, and disproportionated rosin, and an aqueous solution capable of immiscibility therewith of a salt of a boric acid and an alkali metal, the said solution having a pH between about 8 and about 12, extracting acidic components from the initial resin solution into the borate salt solution, separating the borate salt solution from the resin solution, bringing the borate salt solution into contact with a lower aliphatic ether, extracting resin acids from the borate salt solution into the lower aliphatic ether, and separating the resulting ether phase containing extracted resin acids from the borate salt solution.

7. The process of refining rosin products which comprises bringing into contact a lower aliphatic ether solution of a resin selected from the group consisting of rosin, isomerized rosin, heat-treated rosin, hydrogenated rosin, polymerized rosin, and disproportionated rosin, and an aqueous solution capable of immiscibility therewith of a salt of a boric acid and an alkali metal, the said solution having a pH between about 8 and about 12, extracting acidic components from the initial resin solution into the borate salt solution, separating the borate salt solution from the resin solution, bringing the borate salt solution into contact with a lower aliphatic ether, extracting resin acids from the borate salt solution into the lower aliphatic ether, separating the resulting ether phase containing extracted resin acids from the borate salt solution, and further extracting resin ether solution with the ether extracted aqueous alkali metal borate solution.

8. The process of refining rosin which comprises bringing into contact a solution of rosin and an aqueous solution capable of immiscibility therewith of an inorganic alkaline salt of an alkali metal, the said solution having a pH between about 8 and about 12, extracting acidic components from the initial rosin solution into the alkaline salt solution, separating the salt solution from the rosin solution, bringing the salt solution into contact with a solvent capable of immiscibility therewith, the said solvent being a solvent for rosin acids but substantially non-solvent for the alkali metal salt, the acid thereof, and the alkali salt-rosin acid extraction product, extracting rosin acids from the salt solution into the solvent immiscible therewith, and separating the resulting solvent phase containing extracted rosin acids from the salt solution.

9. The process of refining rosin which comprises bringing into contact a solution of rosin and an aqueous solution capable of immiscibility therewith of a salt of a boric acid and an alkali metal, the said solution having a pH between about 8 and about 12, extracting acidic components from the rosin solution into the borate salt solution, separating the borate salt solution from the rosin solution, bringing the borate salt solution into contact with a lower aliphatic ether, extracting rosin acids from the borate salt solution into the lower aliphatic ether, separating the resulting ether phase containing extracted rosin acids from the borate salt solution, and recovering a rosin product of increased melting point from the ether solution.

10. The process of refining rosin which comprises bringing into contact a lower aliphatic ether solution of rosin and an aqueous solution immiscible therewith of a sodium borate, the said solution having a pH between about 8 and about 12, extracting acidic components from the rosin solution into the borate salt solution, separating the borate salt solution from the rosin solution, bringing the borate salt solution into contact with a lower aliphatic ether, extracting rosin acids from the borate salt solution into the lower aliphatic ether, separating the resulting ether phase containing extracted rosin acids from the borate salt solution, and recovering a rosin product of increased melting point from the ether solution.

11. The process of refining rosin which comprises bringing into contact a lower aliphatic ether solution of rosin and an aqueous solution immiscible therewith of sodium tetraborate, the said solution having a pH between about 8 and about 12, extracting acidic components from the rosin solution into the borate salt solution, separating the borate salt solution from the rosin solution, bringing the borate salt solution into contact with a lower aliphatic ether, extracting rosin acids from the borate salt solution into the lower aliphatic ether, separating the resulting ether phase containing extracted rosin acids from the borate salt solution, and recovering a rosin product of increased melting point from the ether solution.

12. The process of refining rosin which comprises bringing into contact a lower aliphatic ether solution of rosin and an aqueous solution immiscible therewith of sodium metaborate, the said solution having a pH between about 8 and about 12, extracting acidic components from the rosin solution into the borate salt solution, separating the borate salt solution from the rosin solution, bringing the borate salt solution into contact with a lower aliphatic ether, extracting rosin acids from the borate salt solution into the lower aliphatic ether, separating the resulting ether phase containing extracted rosin acids from the borate salt solution, and recovering a rosin product of increased melting point from the ether solution.

13. The process of refining rosin which comprises bringing into contact a solution of rosin in diethyl ether and an aqueous solution capable of immiscibility therewith of a sodium salt of a boric acid having a concentration between about 0.5% and about 10% of the said salt and a pH between about 8 and about 12, extracting acidic components from the rosin solution into the borate salt solution, separating the borate salt solution from the rosin solution, bringing the borate salt solution into contact with diethyl ether, extracting rosin acids from the borate salt solution into the ether, separating the resulting either phase containing extracted rosin acids from the borate salt solution, and recovering a rosin product of increased melting point from the ether solution.

14. The process if refining rosin which comprises bringing into contact a solution of rosin in diethyl ether and an aqueous solution immiscible therewith of sodium tetraborate in about 5% concentration, extracting acidic components from the rosin solution into the borate salt solution, separating the borate salt solution from the rosin solution, bringing the borate salt solution into contact with diethyl ether, extracting rosin acids from the borate salt solution into the ether, separating the resulting ether phase containing extracted rosin acids from the borate salt solution, and recovering a rosin product of increased melting point from the ether solution.

RICHARD F. B. COX.